(12) United States Patent
Cha et al.

(10) Patent No.: US 8,128,170 B2
(45) Date of Patent: Mar. 6, 2012

(54) RECLINING DEVICE OF SEAT FOR VEHICLE

(75) Inventors: Jaewon Cha, Ulsan (KR); Sangjun Lee, Gyeongbuk (KR)

(73) Assignee: DAS Corporation, Gyeongsangbuk-do (KR)

( * ) Notice: Subject to any disclaimer, the term of this patent is extended or adjusted under 35 U.S.C. 154(b) by 124 days.

(21) Appl. No.: 12/669,936

(22) PCT Filed: Feb. 14, 2008

(86) PCT No.: PCT/KR2008/000872
§ 371 (c)(1),
(2), (4) Date: Jan. 20, 2010

(87) PCT Pub. No.: WO2009/022775
PCT Pub. Date: Feb. 19, 2009

(65) Prior Publication Data
US 2010/0194164 A1    Aug. 5, 2010

(30) Foreign Application Priority Data

Aug. 16, 2007  (KR) .................. 10-2007-0082182

(51) Int. Cl.
*B60N 2/22* (2006.01)
*B60N 2/235* (2006.01)
(52) U.S. Cl. ............................ 297/367 P; 297/367 R
(58) Field of Classification Search .......... 297/367 P, 297/367 R
See application file for complete search history.

(56) References Cited

U.S. PATENT DOCUMENTS

| | | | | |
|---|---|---|---|---|
| 4,143,905 A * | 3/1979 | Hensel et al. | ............ | 297/362 X |
| 5,590,931 A * | 1/1997 | Fourrey et al. | ........ | 297/367 R X |
| 6,085,386 A * | 7/2000 | Blanchard et al. | .......... | 16/325 X |
| 6,112,370 A * | 9/2000 | Blanchard et al. | ..... | 297/367 R X |
| 6,149,235 A * | 11/2000 | Fahim | ................... | 297/367 R X |
| 6,629,733 B2 * | 10/2003 | Matsuura et al. | ............ | 297/366 |
| 6,648,414 B2 * | 11/2003 | Ikegaya et al. | ........... | 297/367 R |
| 6,666,515 B2 * | 12/2003 | Asano et al. | .......... | 297/367 R X |
| 6,854,802 B2 * | 2/2005 | Matsuura et al. | ......... | 297/367 R |
| 7,144,082 B2 * | 12/2006 | Ohba | ........................ | 297/367 R |
| 7,150,503 B2 * | 12/2006 | Ohba | ........................ | 297/367 R |
| 7,341,311 B2 * | 3/2008 | Ohba | ....................... | 297/367 R |
| 7,578,556 B2 * | 8/2009 | Ohba et al. | ............ | 297/367 R X |
| 7,578,557 B2 * | 8/2009 | Becker et al. | ............ | 297/367 R |
| 7,588,294 B2 * | 9/2009 | Matsumoto et al. | ...... | 297/367 R |
| 7,677,666 B2 * | 3/2010 | Grable | .................. | 297/367 R X |
| 7,828,385 B2 * | 11/2010 | Reubeuze | .............. | 297/367 P X |
| 7,963,607 B2 * | 6/2011 | Heo | ........................... | 297/367 P |
| 2002/0175548 A1 * | 11/2002 | Asano et al. | .................. | 297/367 |
| 2005/0140196 A1 * | 6/2005 | Park et al. | ..................... | 297/367 |
| 2006/0091712 A1 * | 5/2006 | Tokui et al. | .................... | 297/367 |
| 2008/0122282 A1 * | 5/2008 | Matsumoto et al. | .......... | 297/367 |

FOREIGN PATENT DOCUMENTS

| | | |
|---|---|---|
| JP | 8-253063 A | 10/1996 |
| KR | 10-0513576 B1 | 9/2005 |
| KR | 10-0742829 B1 | 7/2007 |

* cited by examiner

*Primary Examiner* — Rodney B White
(74) *Attorney, Agent, or Firm* — Dickstein Shapiro LLP

(57) ABSTRACT

A reclining device of a seat for a vehicle is disclosed. With the disclosed device it is possible to prevent unexpected pivot of a seatback and improve the passenger's safety by maintaining the engagement of a sector tooth 20 and a pawl tooth 70 even if the pawl tooth 70 is separated from a rotational center protrusion 11 by a relatively large external force applied to the seatback.

6 Claims, 7 Drawing Sheets

[Fig. 1]
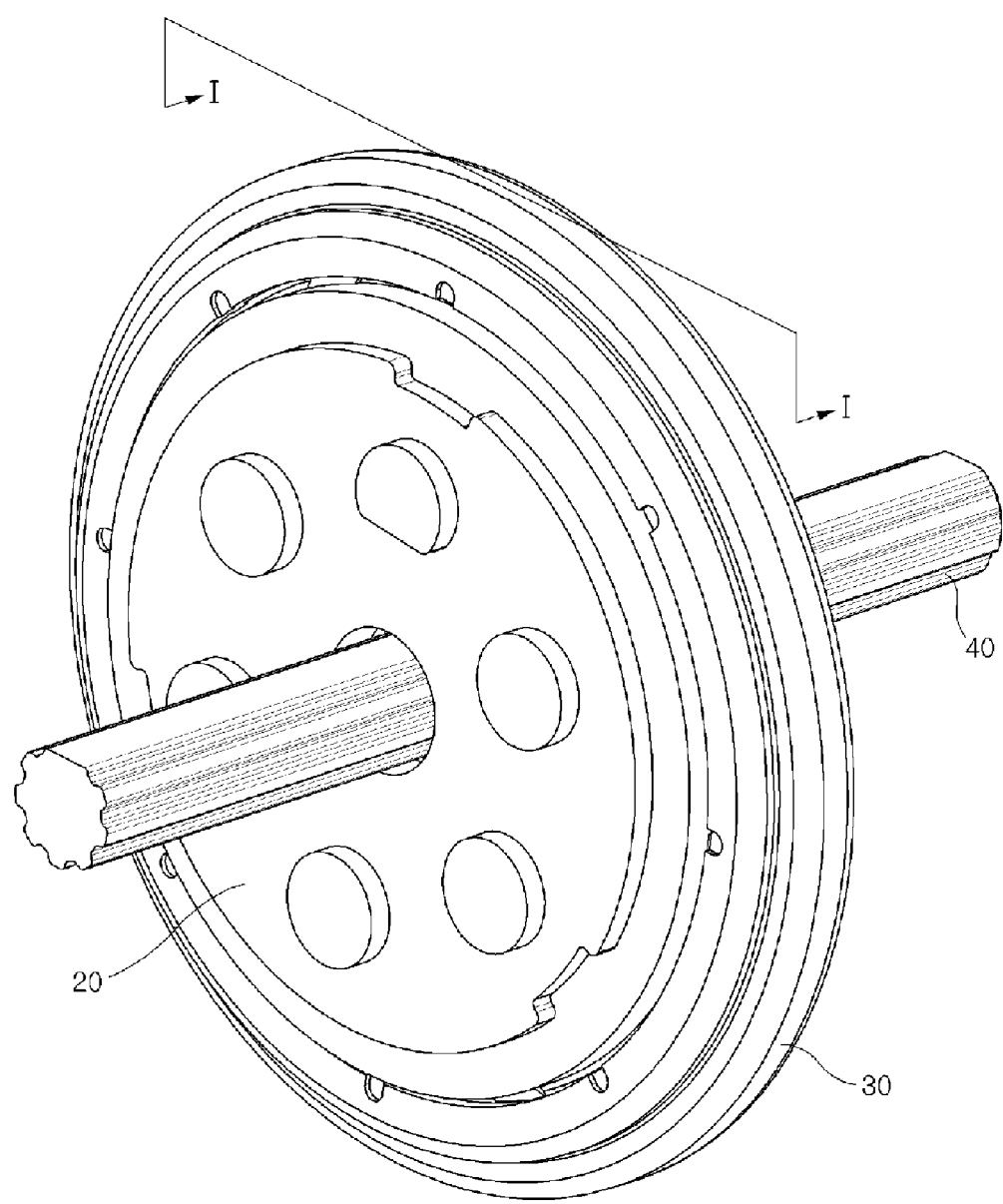

[Fig. 2]
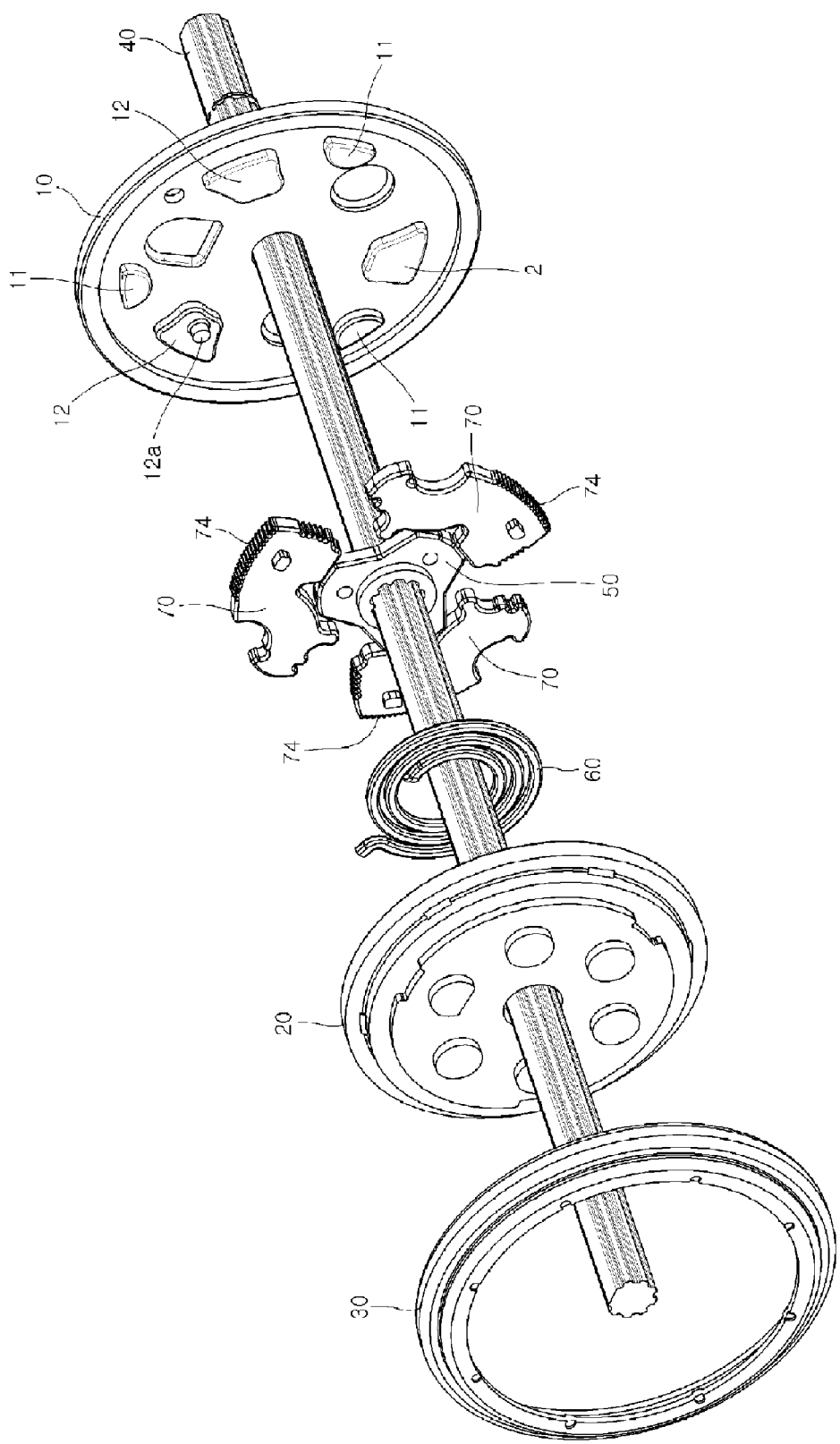

[Fig. 3]
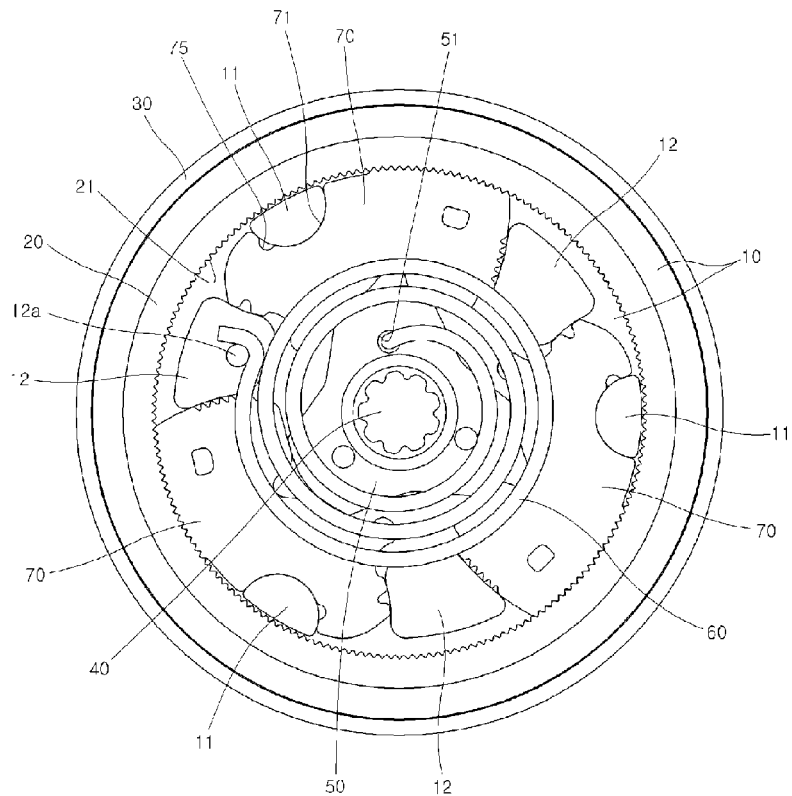
[Fig. 4]
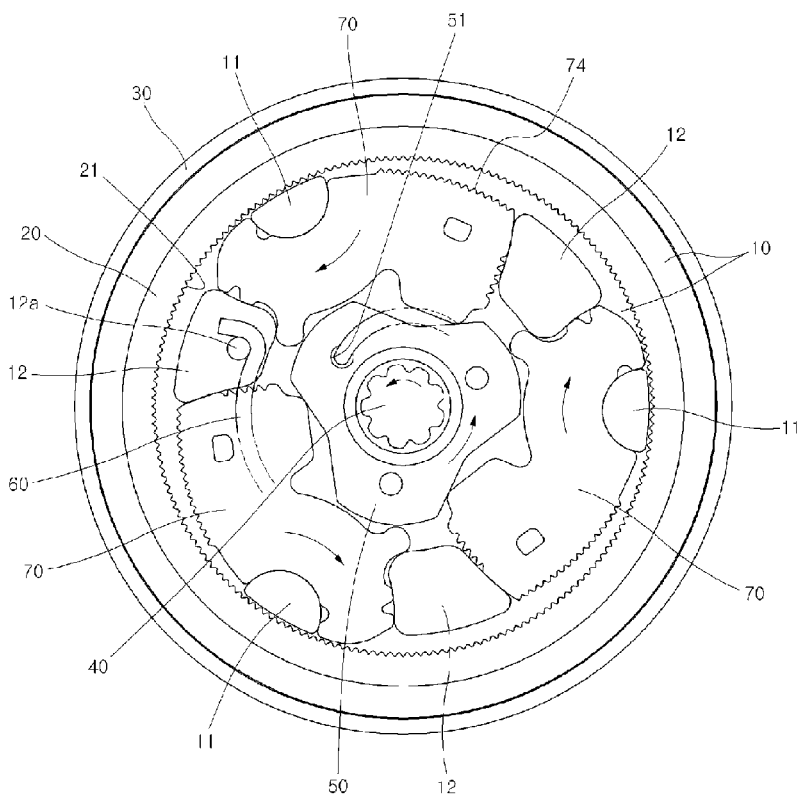

[Fig. 5]
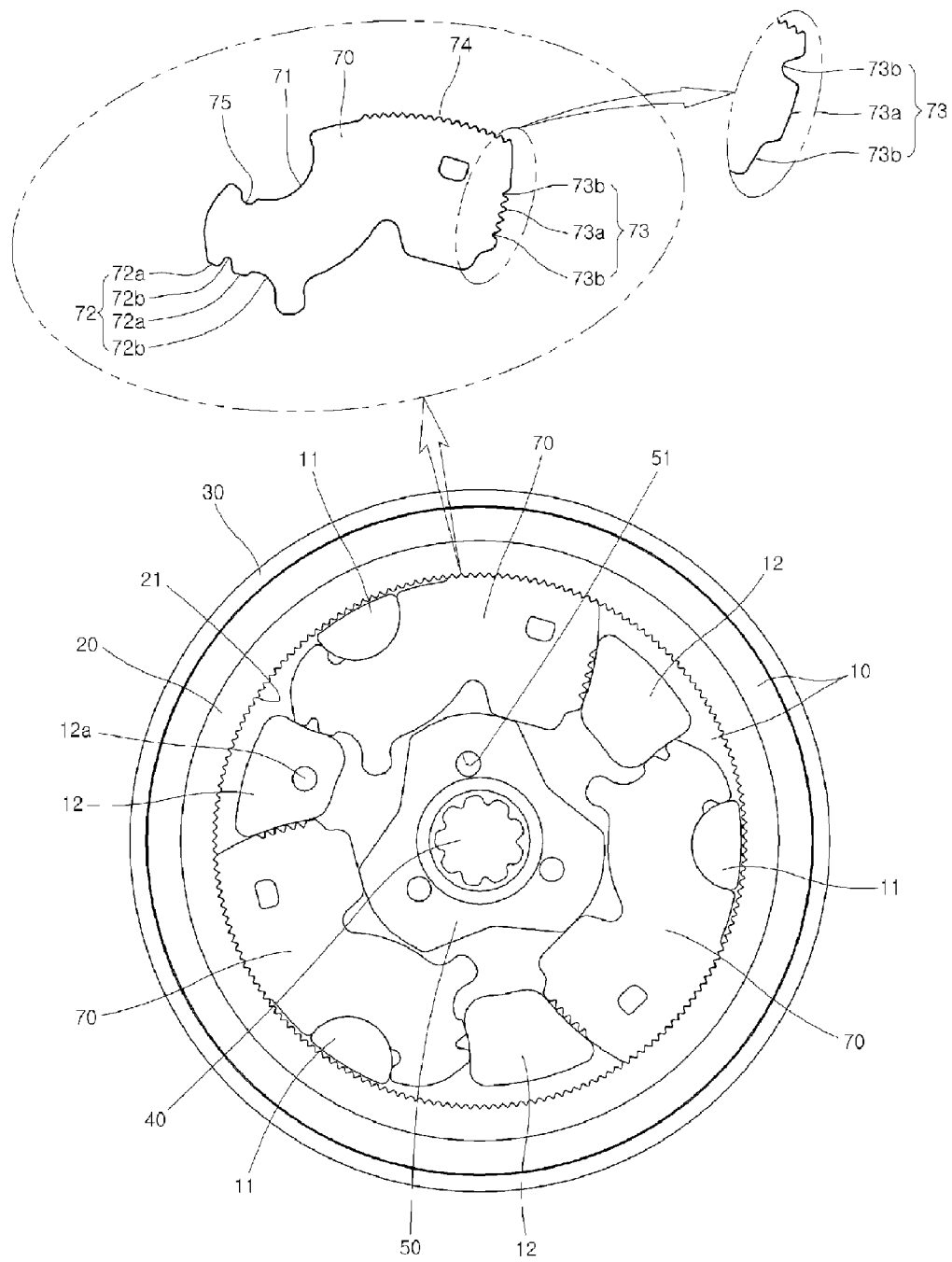

[Fig. 6]
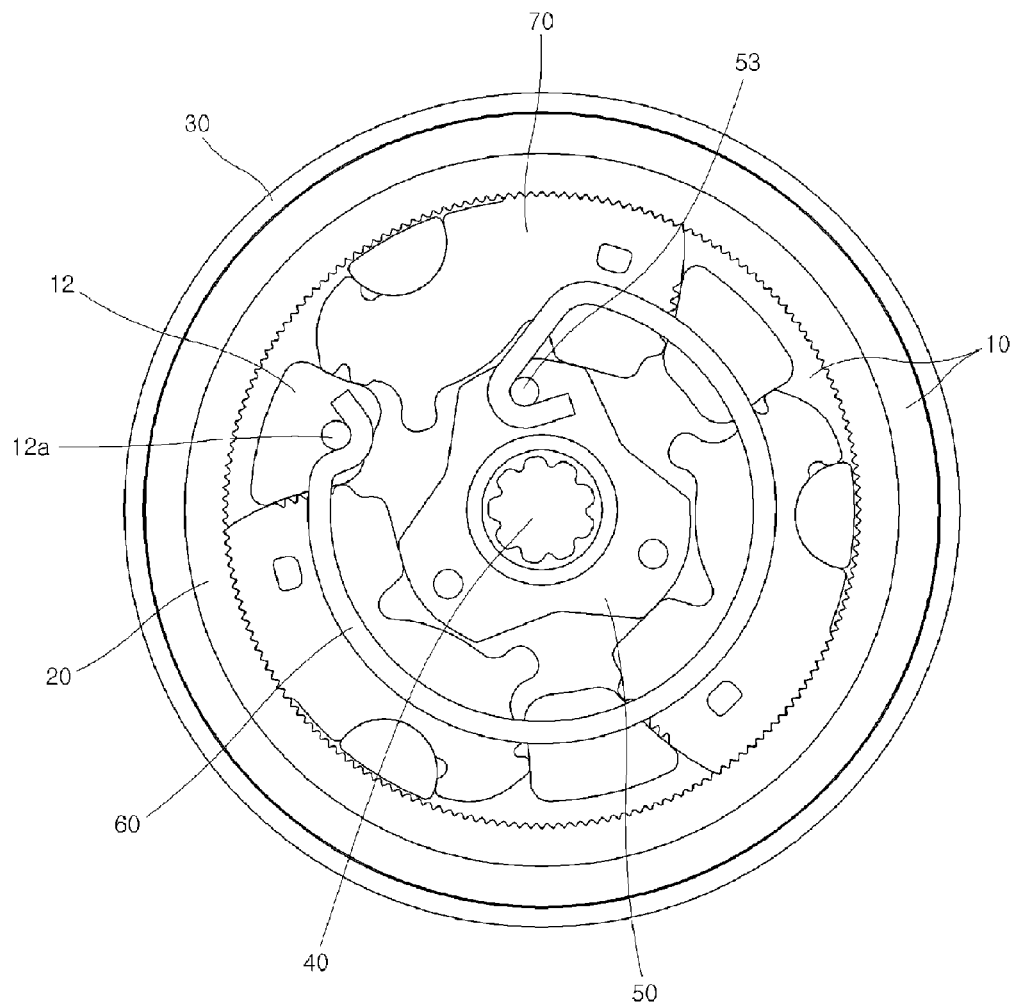

[Fig. 7]
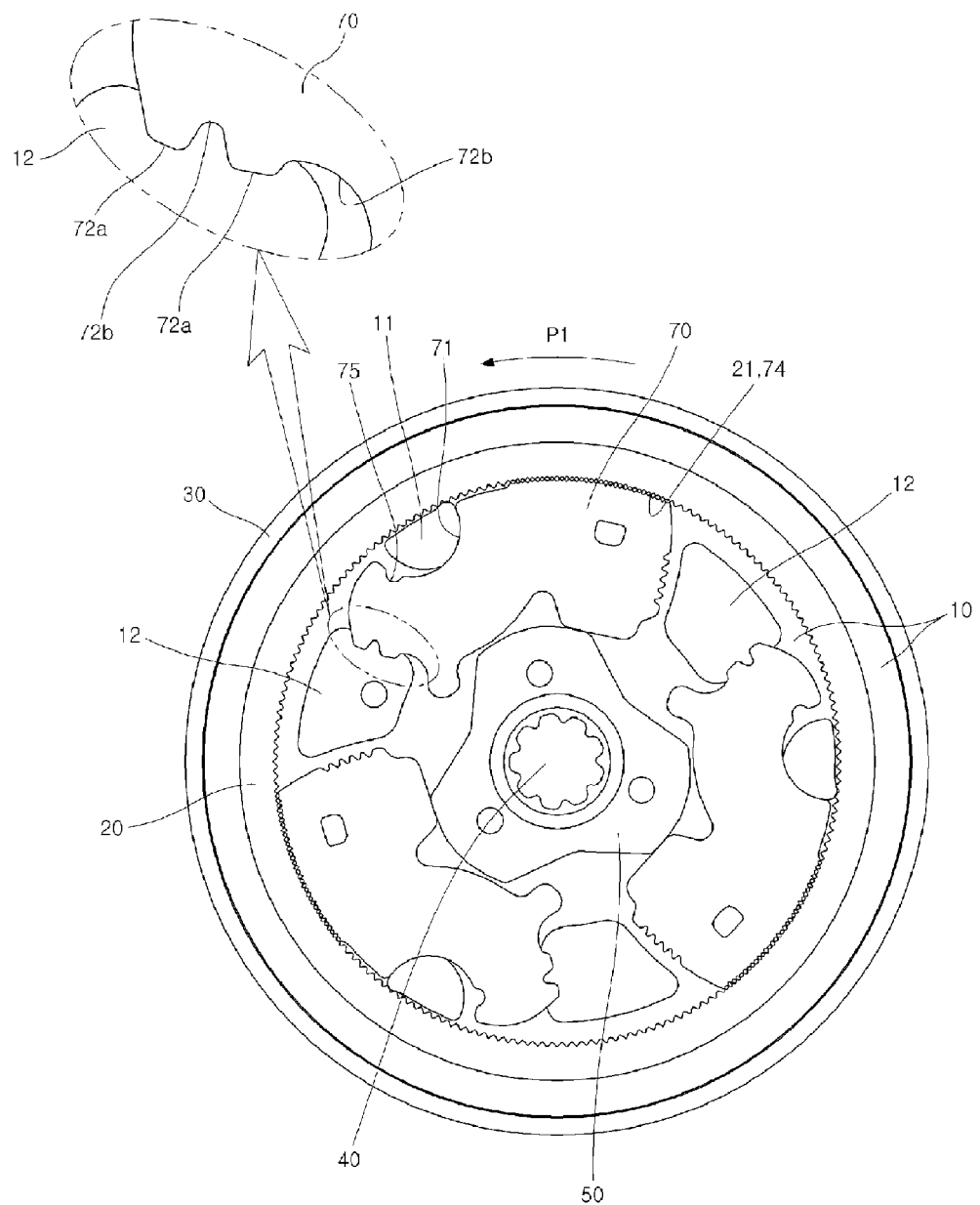

[Fig. 8]
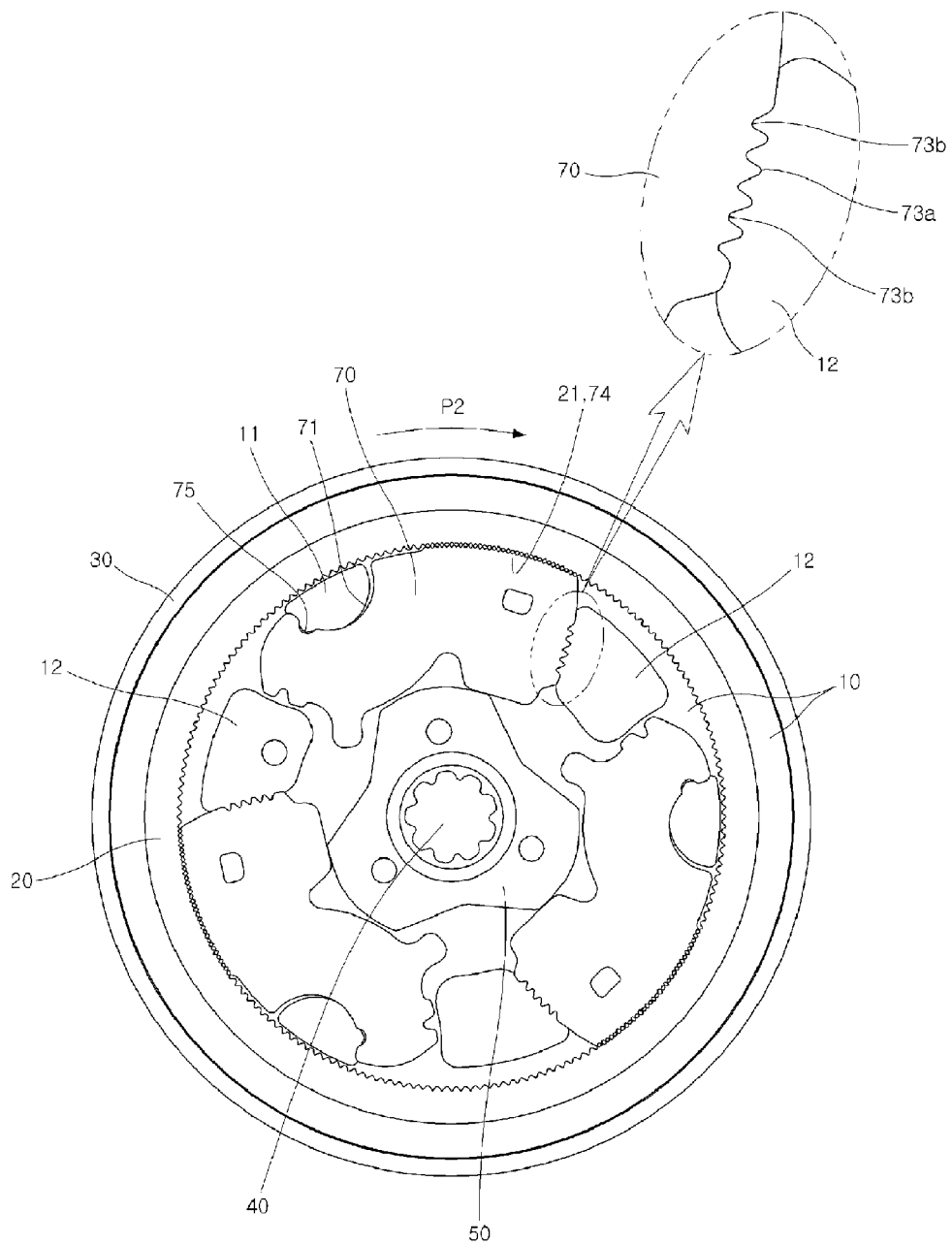

RECLINING DEVICE OF SEAT FOR VEHICLE

TECHNICAL FIELD

The present invention relates to a reclining device of a seat for a vehicle, particularly a reclining device of a seat for a vehicle that improves safety of a passenger by keeping engagement of a sector tooth and a pawl tooth in a collision and also makes it possible to reduce the weight and manufacturing cost by reducing the number of parts.

BACKGROUND ART

In general, a seat in a vehicle is a part for optimally maintaining the position of a passenger, and is largely composed of a seatback supporting the passenger's back and a seat cushion supporting the part of the passenger from the hip to the thigh.

The frame of the seat is composed of a seat cushion frame and a seatback frame and a reclining device is provided to the connecting portion of the seat cushion frame and the seatback frame to adjust the angle of the seatback forward/backward according to the shape of the passenger's body.

The reclining device is composed of a pair of parts that is provided to the left and right sides of the seat, and the two reclining devices each are fitted to both ends of a shaft by a spline.

The reclining device is divided into an electric type that performs reclining while rotated by a driving force of an electric motor and a manual type that performs reclining while rotated by passenger's operation of a lever, and the manual type is described herein.

Further, the reclining device should have a strong engagement force between geared parts to improve the entire strength and prevent an erroneous operation.

It is preferable to increase the size of the reclining device in order to increase the engagement force between the geared parts, but it is difficult to unlimitedly increase the size of the reclining device because the size is determined in consideration of the size of the seat.

Accordingly, according to the reclining device in the related art, the sector tooth and the pawl tooth are forcibly disengaged by the load applied to the seatback by the passenger in a car collision, and as a result the seatback unexpectedly pivots and the passenger's safety is threatened.

DISCLOSURE OF INVENTION

Technical Problem

It is an object of the invention to provide a reclining device of a seat for a vehicle that prevents unexpected pivot of a seatback and improves the passenger's safety by changing the structure such that a sector tooth and a pawl tooth are kept engaged even if load is applied to the seatback by a passenger in a collision while maintaining the compact size.

Further, it is another object of the invention to reduce the weight and manufacturing cost by reducing the number of parts.

Technical Solution

In order to achieve the objects, a reclining device of the invention includes: a cam lever that is disposed between a plate holder and a sector tooth to be elastically rotated by a cam spring and through which a shaft passes; and a plurality of pawl tooth that is fitted around the rotational center protrusion of a plate holder to make a seesaw-typed rotation while contacting with the cam lever that rotates, and have both sides that face the circumferential direction of the plate holder and are guided by a guide protrusion of the plate holder, in which pressing protrusions and fitting grooves, which are engaged with the guide protrusion while recessing the side of the guide protrusion when the pawl tooth is separated from the rotational center protrusion by an external force, are continuously formed on both sides of the pawl tooth.

Advantageous Effects

According to the reclining device of the invention, it is possible to prevent unexpected pivot of the seatback and improve the passenger's safety by maintaining the engagement of the sector tooth and the pawl tooth even if the pawl tooth is separated from the rotational center protrusion by a relatively large external force applied to the seatback.

Further, according to the reclining device of the invention, it is possible to reduce the weight and manufacturing cost by reducing the number of parts and increase the engagement strength of the sector tooth and the pawl tooth without increasing the size, such that it is possible to achieve a compact design and freely disposed the device, thereby reducing the manufacturing cost.

BRIEF DESCRIPTION OF THE DRAWINGS

FIGS. 1 and 2 are a perspective view and an exploded perspective view illustrating a reclining device that has been assembled according to the invention.

FIG. 3 is a cross-sectional view taken along the line I-I of FIG. 1.

FIG. 4 is a view illustrating the operation of the reclining device.

FIG. 5 is a view illustrating a pawl tooth of the reclining device according to the invention, in which a cam spring is removed from FIG. 3.

FIG. 6 is a view showing another example of the cam spring.

FIGS. 7 and 8 are view illustrating engagement of the pawl tooth and a guide protrusion when the pawl tooth is separated from rotational center protrusions by an external force.

MODE FOR THE INVENTION

A reclining device that adjust the angle of a seatback forward/backward according to the invention, as shown in FIGS. 1 to 5, includes: a plate holder 10 that is fixed to a seat cushion frame; a sector tooth 20 that is fixed to a seatback frame, has gear teeth 21 on the inner circumference, and is combined with the plate holder 10 to cover the front side of the plate holder 10; a cover bracket 30 in which the outer circumference of the plate holder 10 and the outer circumference of the sector tooth 20 are accommodated such that the plate holder 10 and the sector tooth 20 are combined; a shaft 40 that passes through the centers of the plate holder 10 and the sector tooth 20 while passing through both sides of a seat; and an operating unit that is disposed in a space between the plate holder 10 and the sector tooth 20 and selectively engaged with the gear teeth 21 of the sector tooth 20 as the shaft 40 rotates.

A plurality of rotational center protrusions 11 and guide protrusions 12 integrally protrude from the front side of the plate holder 10 toward the sector tooth 20.

The rotational center protrusions 11 are spaced apart from each other at the same radial distance from the shaft 10.

One guide protrusion 12 is disposed between two rotational center protrusions 11 and the guide protrusions 12 are disposed at the same radial distance from the shaft 40.

Further, the operating unit includes; a cam lever 50 through which the shaft 40 passes and that is fitted on the shaft 40 by a spline in reclining operation; a cam spring 60 that has an end locked to a spring protrusion 12a of the guide protrusion 12 to apply an elastic return force to rotation of the cam lever 50 and the other end fitted in a spring hole 51 formed through the cam lever 50; and a plurality of pawl tooth 70 that each have a protrusion groove 71, which is fitted around the rotational center protrusion 11 to make seesaw-typed rotation while contacting with the cam lever 50 that rotates, and have both sides 72, 73 that face the circumferential direction of the plate holder 10 and are guided by the guide protrusion 12.

The cam spring 60 is one part to reduce the weight and manufacturing cost by reducing the number of parts, and may be a spiral spring wound a plurality of times as shown in FIG. 3, or a spiral spring wound one time as shown in FIG. 6, if needed; however, the shape of the spring can be freely designed and is not limited to any specific type.

The cam spring 60 shown in FIG. 6 has an end locked to the spring protrusion 12a of the guide protrusion 12 and the other end locked to a spring protrusion 53 formed on the cam lever 53.

That is, the other end of the cam spring 60 combined with the cam lever 50 may be fitted in the spring hole 51 or locked to the spring protrusion 53.

Accordingly, the spring hole 51 may be formed through the cam lever 50 or the spring protrusion 53 may be formed on the cam lever 50, but the invention is not limited to any specific type.

Further, pawl tooth 70 is selectively engaged with the sector tooth 20 for reclining operation, and in order to achieve the operation, gear teeth 74 are formed in a predetermined portion of the region facing the sector tooth 20 to be selectively engaged with the gear teeth 21 of the sector tooth 20.

Therefore, in the initial position shown in FIG. 3, the gear teeth 21 of the sector tooth 20 and the gear teeth 74 of the pawl tooth 70 are engaged, while the seatback is locked and cannot pivot about the shaft 40.

In this position, as the shaft 40 is rotated counterclockwise in FIG. 3 by an external force to adjust the forward/backward angle of the seatback, a protrusion on the outside of the cam lever 50 contacts with the protrusion of the pawl tooth 70 and applies a force to the pawl tooth 70, such that the pawl tooth 70 rotates in one direction about the rotational center protrusion 11.

Accordingly, the gear teeth 74 of the pawl tooth 70 is disengaged from the gear teeth 21 of the sector tooth 20 and the sector tooth 20 can rotate with respect to the plate holder 10, such that the seatback can pivot about the shaft 40 for the reclining operation.

Further, the external force applied to the shaft 40 is released after the seatback pivots to a desired angle, the cam spring 60 compressed by the cam lever 50 expands (returns) to the initial position and the cam lever 50 that has rotated in one direction rotates and returns to the initial position, while the pawl tooth 70 also rotates and returns to the initial position, such that the gear teeth 21, 74 are re-engaged with each other and the seatback is maintained at the adjusted angle.

On the other hand, according to the reclining device of the invention, it is possible to maintain the engagement of the sector tooth 20 and the pawl tooth 70 even if the passenger's upper body applies load the seatback by an inertia force in a car collision.

To achieve this configuration, pressing protrusions 72a, 73a and fitting grooves 72b, 73b are continuously formed on both sides 72, 73 of the pawl tooth 70 as shown in FIG. 5 and a fitting groove 75 is formed on the protrusion groove 71.

Further, according to the invention, the pawl tooth 70 has undergone a heat treatment and the sector tooth 20 including the rotational center protrusions 11 and guide protrusions 12 has not undergone a heat treatment, such that the pawl tooth 70 can maintain a relatively large strength as compared with the rotational center protrusions 11 and guide protrusions 12.

Therefore, when large load is applied to the seatback in a car collision, the sector tooth 20, as shown in FIGS. 7 and 8, is forcibly rotated in the direction where load P1, P2 is applied, and the pawl tooth 70 engaged with the sector tooth 20 is separated from the rotational center protrusion 11.

Further, the pressing protrusions 72a, 73a of the pawl tooth 70 are pressed in the guide protrusion 12 while recessing the side of the guide protrusion 12, and the other portions, which are not recessed by the pressing protrusions 71a, 72a, of the side of the guide protrusion 12 and the rotational center protrusion 11 is pressed and inserted in the fitting grooves 71b, 72b, 75 of the pawl tooth.

Accordingly, even though the pawl tooth 70 moves and separates from the rotational center protrusion 11, the movement range is limited by the rotational center protrusion 11 and the guide protrusion 12, such that the engagement of the gear teeth 21 of the sector tooth 20 and the gear teeth 74 of the pawl tooth 70 can be maintained.

FIG. 7 illustrates that the left side 71 of the pawl tooth 70 is in contact with the guide protrusion 12 and movement is limited and FIG. 8 illustrates that the right side 72 of the pawl tooth 70 is in contact with the guide protrusion 12 and movement is limited while the rotational center protrusion 11 is inserted in the fitting groove 75 and the movement is limited.

Therefore, in the reclining device according to an embodiment of the invention, even if the pawl tooth 70 separates from the rotational center protrusion 11 by a relatively large external force applied to the seatback, the engagement of the sector tooth 20 and the pawl tooth 70 is maintained, such that it is possible to prevent unexpected pivot of the seatback and improve the passenger's safety correspondingly.

Further, since the reclining device of the invention can achieve a large engagement strength of the sector tooth 70 and the pawl tooth 20 without increasing the size, it is possible to achieve a compact size and reduce the entire weight.

The invention claimed is:

1. A reclining device of a seat for a vehicle comprising:
a cam lever (50) that is disposed between a plate holder [10) and a sector tooth (20) to be elastically rotated by a cam spring (60) and through which a shaft (40) passes; and
a plurality of pawl teeth (70), each pawl tooth (70) having a protrusion groove (71), which is fitted around a rotational center protrusion (11) of the plate holder (10) to make a seesaw-type rotation while contacting with the cam lever (50) that rotates, and have both sides (72, 73) that face a circumferential direction of the plate holder (10) and are guided by a guide protrusion (12) of the plate holder (10), wherein pressing protrusions (72a, 73a) and fitting grooves (72b, 73b), which are engaged with the guide protrusion (12) when each pawl tooth (70) is separated from the rotational center protrusion (11) by an external force, are continuously formed on both sides (72, 73) of the pawl tooth (70).

2. The reclining device according to claim 1, wherein each pawl tooth (70) further includes a fitting groove (75) that is formed on the protrusion groove (71) and engaged with the rotational center protrusion (11) while the pawl tooth (70) is separated from the rotational center protrusion (11) by an external force.

3. The reclining device according to claim 2, wherein the pawl teeth (70) have a relatively large strength as compared with the rotational center protrusion (11) and the guide protrusion (12).

4. The reclining device according to claim 1, wherein the cam spring (60) is one spiral spring with an end connected to the guide protrusion (12) and the other end connected to the cam lever (50).

5. The reclining device according to claim 4, wherein a spring protrusion (53) protrudes from the cam lever (50), wherein the cam spring (60) is locked to the spring protrusion (51).

6. The reclining device according to claim 1, a spring hole (51) is formed through the cam lever (50), wherein the cam spring (60) has one end fitted within the spring hole (51).

* * * * *